(12) United States Patent
Niemczyk et al.

(10) Patent No.: US 8,005,006 B2
(45) Date of Patent: Aug. 23, 2011

(54) DISCOVERY OF MULTIPLE-PARENT DEPENDENCIES IN NETWORK PERFORMANCE ANALYSIS

(75) Inventors: Steve Niemczyk, San Francisco, CA (US); Antoine Dunn, Kensington, MD (US); Russell Mark Elsner, Bethesda, MD (US); Patrick J. Malloy, Washington, DC (US); Dana Znamova, Rockville, MD (US)

(73) Assignee: OPNET Technologies, Inc, Bethesda, MD (US)

( * ) Notice: Subject to any disclaimer, the term of this patent is extended or adjusted under 35 U.S.C. 154(b) by 194 days.

(21) Appl. No.: 12/478,775

(22) Filed: Jun. 5, 2009

(65) Prior Publication Data

US 2009/0303899 A1 Dec. 10, 2009

Related U.S. Application Data

(60) Provisional application No. 61/059,292, filed on Jun. 6, 2008.

(51) Int. Cl.
*H04L 12/28* (2006.01)

(52) U.S. Cl. ........................................ 370/252; 370/254

(58) Field of Classification Search .................. 370/229, 370/230, 235, 236, 252, 254
See application file for complete search history.

(56) References Cited

U.S. PATENT DOCUMENTS

| | | | |
|---|---|---|---|
| 2005/0030979 A1 | 2/2005 | Malloy et al. | |
| 2006/0013228 A1 | 1/2006 | Malloy et al. | |
| 2006/0050704 A1 | 3/2006 | Malloy et al. | |
| 2008/0019278 A1 | 1/2008 | Niemczyk et al. | |

*Primary Examiner* — Kerri Rose

(74) *Attorney, Agent, or Firm* — Robert M. McDermott, Esq.

(57) ABSTRACT

Multiple parent-dependencies are identified for messages that are received on a network that includes nodes that are configured to avoid the conventional strictly-sequential communications techniques and protocols, in order to accelerate network performance. If a network is known, or assumed, to include intermediate/proxy nodes that are configured to provide acceleration, access control, and other services, the system that analyzes traffic on the network is configured to assume that these nodes may/will provide such features, and thereby introduce multiple dependencies among the messages communicated across the network. For each message transmitted from a forwarding node, messages received at the forwarding node are assessed to distinguish messages from the destination node and messages from an other node, and a dependency is defined for each.

28 Claims, 3 Drawing Sheets

DISCOVERY OF MULTIPLE-PARENT DEPENDENCIES IN NETWORK PERFORMANCE ANALYSIS

This application claims the benefit of U.S. Provisional Patent Application 61/059,292, filed 6 Jun. 2008.

BACKGROUND AND SUMMARY OF THE INVENTION

This invention relates to the field of network analysis, and in particular to the identification of multiple dependencies on packets forwarded from intermediate nodes in a network, and in particular packets forwarded from intermediate application acceleration nodes, such as WAN optimization devices.

The effective management of networks requires the use of a variety of network analysis tools. Many of these tools are configured to analyze actual traffic flows on the network, to characterize the performance of particular applications, diagnose performance problems, perform 'what-if' analyses, and so on.

Of particular significance in network performance analysis is the identification of dependencies associated with the messages that are communicated through the network. In diagnosing a problem, the identification of dependencies can lead to an identification of the cause or causes of the problem, or the elimination of candidate causes. In addressing means for improving the performance of a network, the identification of dependencies can lead to an identification of where best to enhance the network, and/or identify areas in which an enhancement to the network will have minimal impact on the overall performance.

In the general case, the identification of dependencies can lead to an identification of critical paths within the network, or an identification of critical paths associated with a particular application running on the network. U.S. published application 2008/0019278, "NETWORK CONGESTION ANALYSIS", published 24 Jan. 2008, by Steve Niemczyk, Patrick J. Malloy, Alain J. Cohen, and Russell M. Elsner, discloses techniques for identifying critical paths in applications that include multiple paths, and techniques for determining where improvements can be made and estimating the gains that may be achieved by such improvements, and is incorporated by reference herein. Although the techniques presented in this referenced application address applications that include multiple paths, these techniques primarily address the case wherein the multiple paths are substantially independent of each other, and each received message has a single dependency-path back to the initiating request.

In a typical example of a request for data from a server that is coupled to a database, when a requesting node receives a response to the request, that response can be traced back to either a direct response from the server in response to receiving the request from the requesting node, or a response from the server after the server received the response from the database, based on a request from the server to the database upon receipt of the request from the requesting node. That is, in each case, there is a strict sequential order to the responses, and the analysis tools are configured to assume this sequential order, particularly for such tasks as aligning clocks among data collecting devices, performing conditional analyses, and so on. That is, for example, if a response is determined to be dependent upon a prior request, the network analysis tool is configured to never allow the response to be interpreted to have occurred prior to receipt of the request. U.S. published applications 2006/0013228, "PACKET TRACING", published 19 Jan. 2006, and 2006/0050704, "CORRELATING PACKETS", published 9 Mar. 2006, both by Patrick J. Malloy, Michael Cohen, and Alain J. Cohen, address network analysis tasks that rely on determining a sequential dependency among messages, and are incorporated by reference herein.

In a number of network environments, one or more elements are configured to enhance the performance of the network by initiating actions that bypass or otherwise avoid the strict sequentially associated with typical communication transactions. For example, some communication protocols call for an acknowledgement of receipt of a prior transmission by the destination node before sending a subsequent transmission, and some intermediate devices, commonly termed 'proxy' devices, are configured to avoid this requirement by 'spoofing' the transmitting node with an acknowledgement long before the destination node provides the actual acknowledgement. In another example, an intermediate device may be configured to 'pre-fetch' data on behalf of a requesting node, in anticipation of a request for that data by the requesting node.

WAN optimization devices, commonly termed WAN accelerators, have been developed to further enhance these delay-avoidance techniques by operating in tandem using specific protocols that are designed for such tandem devices. FIG. 1 illustrates a typical network configuration using a pair of WAN accelerators 20. Each network node 10 on either side of the network is substantially unaware of the presence of the accelerators 20, and each accelerator 20 is configured to operate as a proxy node for the network nodes 10, appearing as a conventional destination network node 10. That is, the WAN accelerator 20 communicates with the node 10 using a conventional communication protocol common to nodes 10, and communicates with the other WAN accelerator 20 using a communication protocol that is designed to optimize communications between the accelerators 20. For example, each WAN accelerator 20 will generally include a large amount of storage for caching data that has been sent to the nodes 10, and each WAN accelerator 20 knows which data is stored at the other WAN accelerator 20. When a source node 10 subsequently initiates a transmission of some or all of a prior transmission to a destination node 10, the WAN accelerator 20 at the source side of the network merely sends a command to the WAN accelerator 20 on the destination side of the network to initiate a transmission of this previously stored data from its cache to the destination node, thereby avoiding an actual transmission of the data across the network, transparent to either the source or destination nodes. Other techniques for accelerating traffic flow are common in the art of WAN acceleration.

Because of the use of these acceleration/sequence-avoiding techniques, it is often difficult to ascertain the causal relationships and/or parent-dependencies in view of the actual traffic flow. In the case of pre-fetching by an intermediate node, for example, providing a response to the requesting node is dependent upon actually receiving the request from the requesting node, as well as actually receiving the response to the anticipated request by the intermediate node. As noted above, conventional network analysis systems assume a single dependency path for each received message, and are poorly suited for the analysis of networks that include intermediate nodes that introduce multiple dependencies on the receipt of a message.

It would be advantageous to provide a method and system that facilitates the determination of multiple-parent dependencies on messages in a network that includes nodes that generally introduce such dependencies. It would also be advantageous to provide this determination of multiple-parent dependencies to other network analysis tools, to facilitate accurate analyses of traffic flows on the network, and to avoid infeasible situations and/or conclusions within these other network analysis tools.

These advantages, and others, can be realized by a system and method that identifies multiple parent-dependencies for messages that are received on a network that includes nodes that are configured to avoid the conventional strictly-sequential communications techniques and protocols, generally to accelerate network performance. If a network is known, or assumed, to include intermediate/proxy nodes that are configured to provide acceleration services, the system that analyzes traffic on the network is configured to assume that these nodes may/will provide such features, and thereby introduce multiple dependencies among the messages communicated across the network. For each message transmitted from a forwarding node, messages received at the forwarding node are assessed to distinguish messages from the destination node and messages from an other node, and a dependency is defined for each.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 2A:
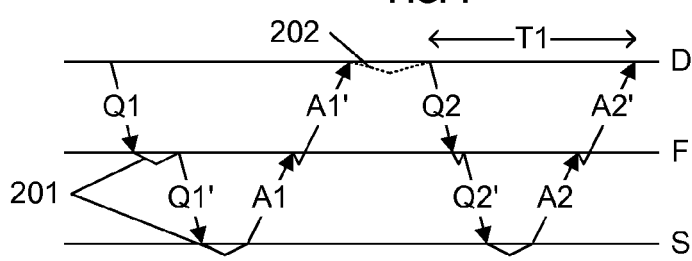
FIGS. 2A-2F illustrate example message sequences.

FIG. 2A illustrates an example message sequence. Node D sends a message/query Q1 to node S, via intermediate/forwarding node F. Node F processes the query Q1 to determine that it is directed to node S, and forwards the query to node S as query Q1'. Node S processes the query Q1 and provides a response/answer A1 to node F. Node F processes the answer to determine that it is directed to node D, and forwards the answer to node D as answer A1'. The designations of "D", "F", and "S" are used for convenience and generally refer to the "source" node S of information that is sent to a "destination" node D via a "forwarding" node F.

The "V" shaped connections 201 indicate the dependency of each message on its predecessor message. That is, Q1' is dependent upon receipt of Q1 at node F, because node F would not have sent message Q1' to node S had it not received message Q1 from node D. In like manner, message A1 is dependent upon receipt of message Q1 at node S, and message A1' is dependent upon receipt of message A1 at node F.

Also illustrated in FIG. 2A is a second question-answer sequence Q2-Q2'-A2-A2'. Although Q2 is sent after receipt of A1', it is not, per se, dependent upon A1', because the user at node D could have submitted the second question before receiving a response to the first question. On the other hand, the second query Q2 could have been dependent upon receipt of the answer A1'. However, because monitoring of these messages typically provides no information regarding whether the second question could have been initiated before receipt of A1', most conventional network analysis systems will infer a dependency 202 if the length of time between the receipt of message A1' and the transmission of message Q2 suggests causality. Alternatively, as taught in the aforementioned patent publication 2008/0019278, "NETWORK CONGESTION ANALYSIS", it may be recognized that the Q1-Q1'-A1-A1' and Q2-Q2'-A2-A2' sequences constitute independent sequences, and the inferred dependency 202 would not occur, or would be defined such that Q2 is dependent on Q1.

Of particular note, regardless of whether the user submits the second query Q2 before or after receiving the first answer A1', the forwarding node F of FIG. 2A processes all messages in a strictly sequential manner. Forwarding node F waits to receive a message from one node, and then forwards that message some (short) time after receiving it.

The purpose of defining dependencies is to allow network analysis systems to identify critical paths for transactions of interest, and to perform critical path analyses for such transactions. In a typical embodiment, network analysis systems, and particularly systems that perform "what-if" analyses, use the defined dependencies to avoid producing infeasible sequences of events or results based on such infeasible sequences. For example, a user of a network analysis system may desire to know what effect increased bandwidth or improved processing would have on the performance of the network using this same sequence of messages. In such analyses, the slope of the arrows, which indicates the difference in time between the transmission of a message from one node to another node, will increase and/or the duration of time between receipt of one message and transmission of another will decrease. The overall effect of such analyses is to shift the messages to the left by shortening the critical path or creating a different critical path. The dependencies are used to prevent the shifting of a message to a time before the occurrence of the message that it is dependent upon (herein termed the 'parent' message). That is, for example, regardless of the proposed/hypothesized improvements to the link between F and S of FIG. 2A, and regardless of the improvement of processing at either F or S, or both, the network analysis system will constrain the sliding of Q1' so as to never occur before Q1 arrives at node F, because Q1' is defined to be dependent on Q1 at node F.

As noted above, conventional dependency determinations are based solely on the assumption that if a message is transmitted/forwarded from a node soon after receiving a message at the node, the transmitted message is assumed to be dependent upon receipt of the received message at the node. Generally, the messages at the forwarding node are filtered to identify messages that correspond to a particular transaction, using, for example, the header data or other information in the messages, so that received messages that are unrelated to the particular transaction are not mistakenly identified as the causing/parent message. For example, forwarding node F may be forwarding messages to other nodes, or to the same node, but in response to a different transaction, such that there are other messages appearing in the trace data received from the nodes. In the example of FIG. 2A, the content of message A1' can be compared to the content of other received messages at node F to eliminate received messages that do not correspond to the message A1 that provided the content of message A1'. Optionally, the application at the transmitting node, or the application on the forwarding node can be configured to add special information to the messages or the trace data to explicitly identify correspondences between receptions and transmissions to facilitate this dependency determination.

Figure 1:
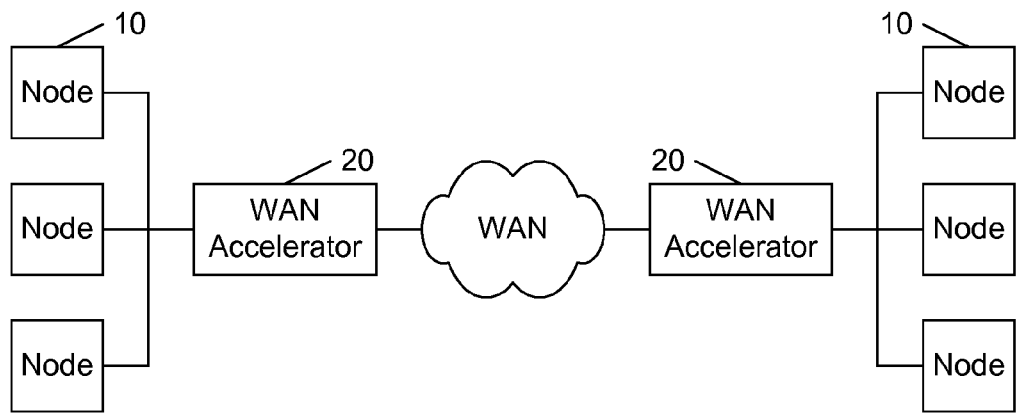
FIG. 1 illustrates an example network with a pair of WAN accelerators.
Figure 2B:
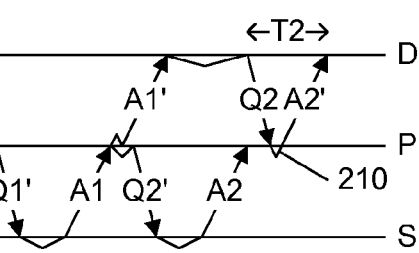

FIG. 2B illustrates a similar question-answer scenario as FIG. 2A, but in this example, a forwarding node P includes features that allow it to avoid the strictly sequential nature of messages in FIG. 2A. For ease of reference and convenience, forwarding nodes that may provide features to improve performance over a strictly sequential forwarding node are herein termed "proxy" nodes, because conventional proxy nodes generally provide such features. Other terms, such as "acceleration node" are also commonly used. In the example of FIG. 1, each of the WAN accelerators 20 operates as a proxy node as the term is used herein.

In FIG. 2B, the proxy node P is configured to 'prefetch' the second answer A2 from node S, in anticipation of receiving the request Q2 for this answer. That is, node P is aware of a correlation between questions Q1 and Q2, such that Q2 generally follows Q1, and submits Q2' to node S in order to be able to respond to node D sooner than it would if it waited until node D submits question Q2. For example, Q1 may be a request for an address, and Q2 may be a request for a map for that address. When node P receives the address A1 from node S, it sends the request Q2' for the map, so that if/when the user of node D submits the request Q2 for the map to node P, it will have it available in its memory, and can respond immediately to request Q2 with the response A2.

As can be seen, the response time T2 to the request Q2 at node D of FIG. 2B is substantially smaller than the strictly sequential response time T1 to this same request Q2 at node D of FIG. 2A, because the node P of FIG. 2B is able to respond immediately to the request Q2, whereas the node F of FIG. 2A must wait while its request Q2' is answered by node S.

With regard to dependencies, the conventional technique of identifying the last received message that is proximate in time to a transmitted message as the cause/parent of the transmitted message will identify the dependency 210 of transmitting answer A2' upon the receipt of question Q2. This is a properly identified dependency; the proxy node P should not send the anticipated answer to node D until the user of node D actually submits the request Q2, because on many occasions, the user may submit a different question than the anticipated question Q2, for which the answer A2' would not be appropriate.

Note, however, that the conventional technique of identifying dependency 210 fails to recognize that the transmission of A2' from P to D is also dependent upon receipt of the answer A2 at node P. In the above map example, node P cannot provide the map A2' to node D until it receives the map A2 from node S, and should not provide it to node D until it receives the request Q2 from node D. In FIG. 2B, in addition to the dependency 210 between A2' and Q2 of FIG. 2B, another dependency should be shown between A2' and A2.

Figure 2C:
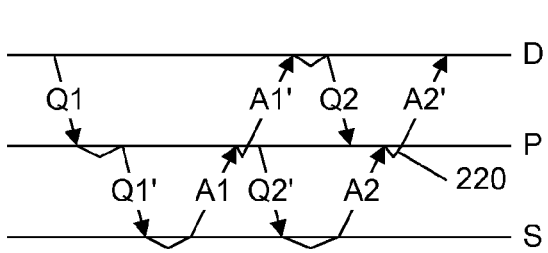

FIG. 2C illustrates another scenario, in which the proxy node P submits the prefetch request Q2' to node S, but receives the request Q2 from node D before it receives the answer A2 from node S. In this scenario, node P cannot send the answer A2' to node D until it receives the answer A2 from node S, and the conventional dependency identification technique will properly identify this dependency 220. Note, however, that the conventional dependency identification technique will now omit the dependency of transmitting the answer A2' to node D only after receiving the question Q2 from node D.

Figure 2D:
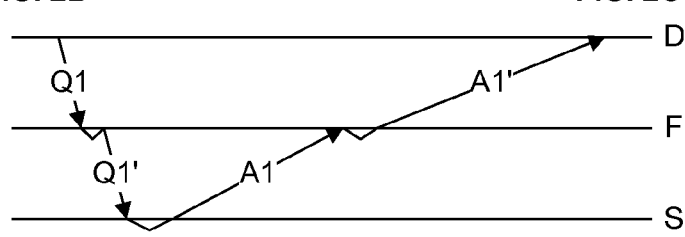
Figure 2E:
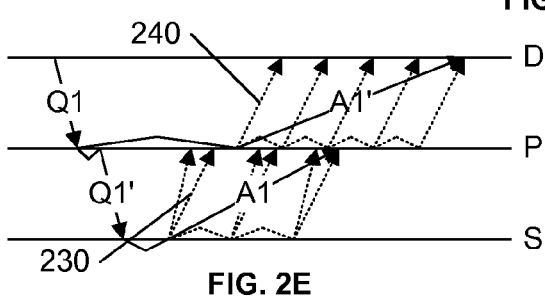

FIG. 2E illustrates another acceleration technique that is commonly used for forwarding large messages/files. In a strictly sequential process, such as illustrated in FIG. 2D, a forwarding node F receives a message A1, and then initiates the transmission of the message A1'. In FIG. 2E, the proxy node P anticipates a completed transmission of the message A1 from node S, and commences the transmission of message A1' to node D as soon as it has enough data to make the transmission worthwhile.

In the example of a pair of WAN accelerators 20 of FIG. 1, communication between the accelerators 20 is generally more efficient than between the accelerators 20 and the nodes 10, using, for example, a compressed data format between the accelerators 20. When an accelerator 20 receives an amount of compressed data (A1 of FIG. 2E) to generate a sufficient amount of uncompressed data (A2 of FIG. 2E) to send to the destination node 10, the accelerator will commence transmission.

In a conventional dependency identification process, dependencies between messages are identified as detailed above, each transmitted message A1' being dependent upon an immediately preceding received message A1, and packets or data blocks within a message are each dependent upon transmission of the preceding packet. In FIG. 2E, packets within messages A1 and A1' are illustrated as dashed lines, and the within-message dependencies are illustrated as dashed inverted "V"s.

For ease of reference and convenience, the term packet is used hereinafter to indicate a defined block of data that is communicated as such, and may include one or more discrete transmission elements.

Using the conventional dependency identification process, the message A1' will either be determined to be dependent upon the last received message Q1, or, if the time between A1' and Q1 is longer than some 'proximate-in-time' threshold, will be determined to be independent of any prior received message. However, the commencement of transmission of message A1' is also dependent upon receiving a sufficient amount of message A1 to provide the initial packets of message A1'. That is, the first packet 240 of message A1' from node P is dependent upon receipt of packet 230 of message A1 at node P from node S, but this dependency will not be identified in a conventional dependency identification process. In like manner, the transmission of subsequent packets in message A1' is dependent upon receipt of subsequent packets in message A1. Although the exact dependency between packets in message A1' and packets in message A1 may not be determinable, particularly if message A1 is a compressed form of message A1', an identification of some intra-packet dependency will be sufficient to avoid infeasible situations in subsequent network analyses tasks.

Figure 2F:
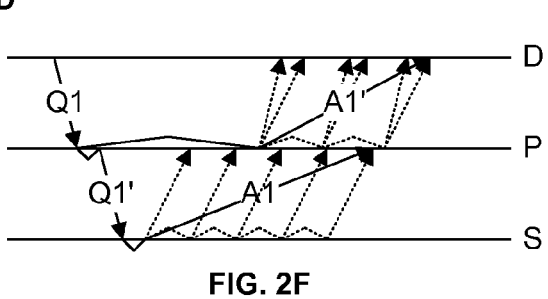

A similar scenario is illustrated in FIG. 2F, except that in this example, the proxy node is illustrated as receiving uncompressed data from the source S, and forwards the data as compressed data to destination D. Using the example of FIG. 1, FIG. 2F can be considered to illustrate the receipt of a large file A1 from a node 10 at the accelerator 20 and the forwarding of the file A1' using the more efficient accelerator-to-accelerator communications, whereas FIG. 2E illustrates the receipt of a large file A1 at one accelerator 20 from the other accelerator 20, and the forwarding of this large file A1' to a node 10.

In the scenario of FIG. 2F, as in the scenario of FIG. 2E, the conventional dependency identification process will not identify any dependency between message A1' and message A1, because message A1 is received at node P "after" message A1' is transmitted from node P.

In accordance with aspects of this invention, dependencies that are not identified in conventional dependency identification processes due to the avoidance of strictly sequential processes at proxy nodes will be identified and provided to subsequent analyses processes to enable these processes to avoid infeasible or impossible situations. In a preferred embodiment of this invention, nodes that can introduce non-sequential scenarios are identified as proxy nodes, and transmissions from these nodes are assumed to include multiple parent dependencies. The inventors have observed that transmissions from proxy nodes are often dependent upon being able to forward the message (forwarding dependency) and upon being requested to provide the message (requesting dependency).

The terms 'forwarding' and 'requesting' dependencies are used hereinafter for convenience and ease of understanding, and do not imply that these dependencies are limited to explicit forwarding or requesting actions. In accordance with this invention, a 'forwarding' dependency is a dependency of a transmission to a node that is based on a reception from a different node, whereas a 'requesting' dependency is a dependency of a transmission to a node that is based on a reception from that same node. For example, when a WAN accelerator 20 transmits data to a node 10 based on a command from the other accelerator 20, the transmission of the data will have a "forwarding" dependency on receipt of the command, even though the received command is not, per se, being forwarded. In like manner, when a node provides a transmission in response to an acknowledgement of receipt of a preceding message, the transmission will have a "requesting" dependency on receipt of the acknowledgement, even though the acknowledgement is not a request, per se.

Figure 3:
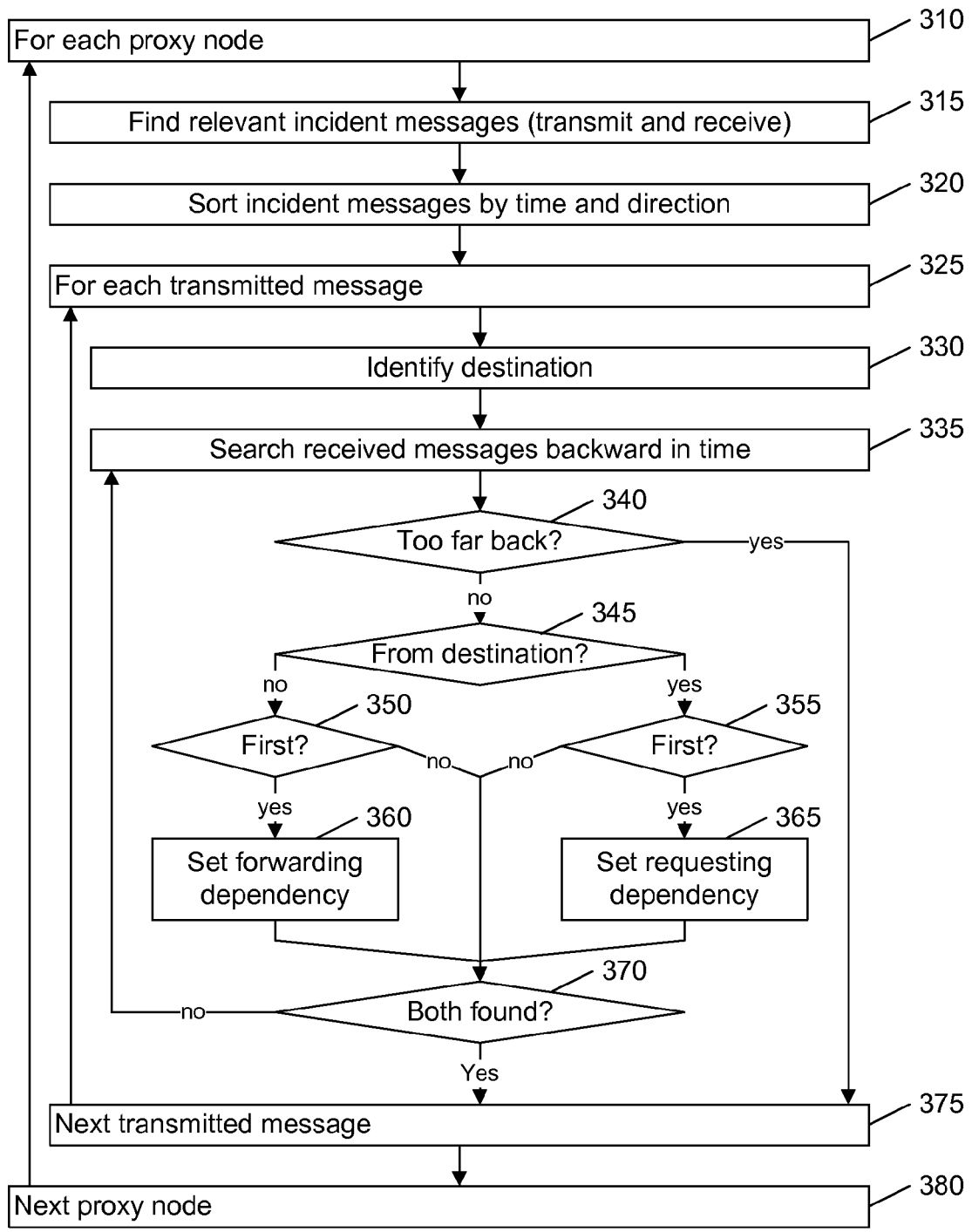
FIG. 3 illustrates an example flow diagram in accordance with principles of this invention.

FIG. 3 illustrates an example flow diagram for embodying aspects of this invention. At 310, the proxy nodes are identified, and the transmissions from each proxy node are processed via the loop 310-380.

At 315, relevant transmitted and received messages are identified. As noted above, depending upon the particular techniques used to collect the data from the nodes, the collected data may include transmissions and receptions that are unrelated to the transaction being analyzed. Any of a variety of techniques may be used to identify relevant messages, including, for example, investigating information contained in the header of each message. Additionally, in a preferred embodiment of this invention, select transmissions from particular proxy nodes may be processed to identify messages that are relevant to the subsequent dependency identification process. For example, proxy nodes that are known to commence the forwarding of a long message before completion of receipt of the message will be identified, and packets within such long messages will be defined as 'messages' for subsequent processing in FIG. 3 to identify the dependencies of these packets/messages, as discussed above with regard to FIGS. 2E-2F. In like manner, if some messages from a proxy node are known to be strictly sequential, these messages can be eliminated from the subsequent processing of FIG. 3, relying on conventional dependency determination techniques to identify this strictly sequential dependency.

At 320, the relevant messages are preferably sorted by time, to facilitate subsequent time-based processing.

The loop 325-375 is structured to identify a forwarding and requesting dependency for each of the above identified relevant transmitted messages for the current proxy node. At 330, the destination of the message is identified, in order to distinguish 'forwarding' and 'requesting' dependencies.

At 335, the sorted messages are searched backward in time to identify the most recent receptions that may have caused the current transmission to the identified destination. At 340, the time between the identified reception and the current transmission is above a 'proximate-in-time' threshold, the identification of dependency for this transmission is terminated (via 375), on the assumption that a long gap in time between reception and transmission implies an independence of these events. One of skill in the art will recognize that different proximity-in-time tests could be applied, depending upon the particular messages, or types of messages.

If, at 345, the identified reception of 335 is from the identified destination of 330, and, at 355, if this is the first identified reception from the destination, a requesting dependency is defined between the current transmission and the identified reception, at 365.

If, at 345, the identified reception of 335 is not from the identified destination of 330, and, at 350, if this is the first identified reception that is not from the destination, a forwarding dependency is defined between the current transmission and the identified reception, at 360.

If both dependencies are found, at 370, the identification of dependency for this transmission is terminated, at 375. If either dependency remains to be found, the above described process is repeated, via 335, by assessing the next preceding reception.

Each subsequent transmission from the current node is similarly assessed, via 375, and each subsequent proxy node is assessed, via 380.

As illustrated in FIG. 3, each forwarding and requesting dependency of each transmission on proximate received messages, if any, will be identified. Preferably, a conventional dependency determination process is also applied to identify the strictly sequential dependencies of the remaining transmissions of the transaction of interest. These dependencies will preferably be stored for subsequent use by one or more network analysis processes.

Figure 4:
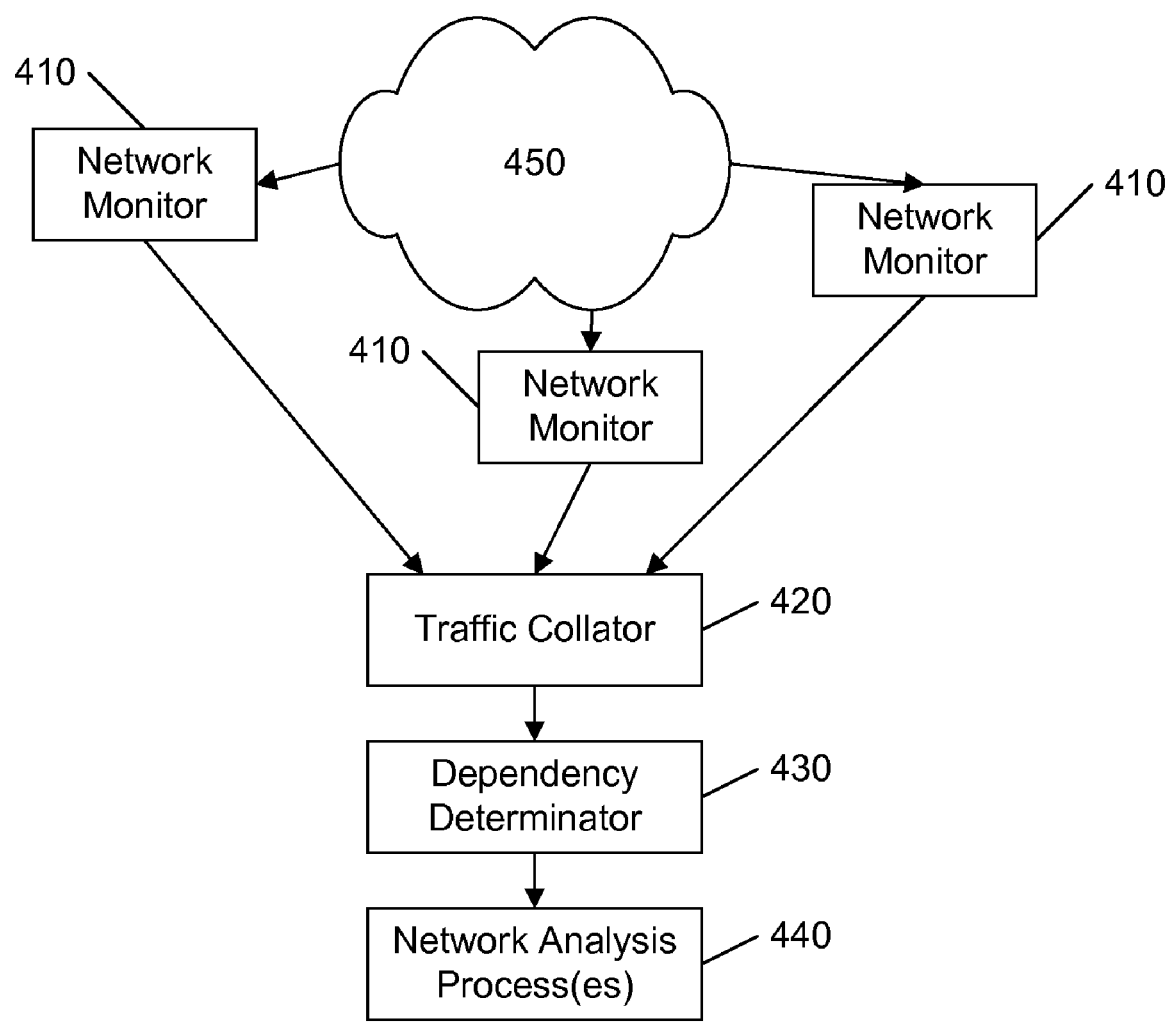
FIG. 4 illustrates an example block diagram in accordance with principles of this invention.

FIG. 4 illustrates an example block diagram of a network analysis system that includes a dependency-determination process in accordance with this invention.

One or more network monitors 410 are configured to collect trace data corresponding to transmissions and receptions among select nodes of the network 450. Typically, the trace data will include some or all of the header data of each transmitted and received message, as well as the recorded time of transmission and receipt. A traffic collator 420 is configured to process, filter, and synchronize the trace data, to set these records to a common time base, and to link corresponding transmission and reception records. Fundamentally, the traffic collator 420 provides the collected trace data in a form that allows for the determination of traffic flow as illustrated in FIGS. 2A-2F.

The dependency determinator 430 is configured to identify dependencies among messages, and in particular, the dependency, if any, of each transmission from a node on one or more receptions at that node. In a preferred embodiment, the dependency determinator 430 identifies single dependencies using conventional dependency determination techniques, as well as multiple dependencies using the techniques presented in this disclosure. Specifically, the dependency determinator 430 is configured to identify requesting dependencies and forwarding dependencies, if any, between transmissions to a destination and receptions from the destination and from another node, respectively.

The dependencies identified by the dependency determinator 430 are provided to one or more network analysis processes to facilitate performance analyses, including conditional analyses, commonly termed 'what-if' analyses. As noted above, these identified dependencies enable the network analysis processes to identify the critical paths of transactions of interest and to perform one or more critical path analyses of these transactions on the network or on hypothesized networks. In this manner, the network analysis processes can avoid infeasible sequences of events or results based on such infeasible sequences, such as requested data arriving before the request is submitted. The foregoing merely illustrates the principles of the invention. It will thus be appreciated that those skilled in the art will be able to devise various arrangements which, although not explicitly described or shown herein, embody the principles of the invention and are thus within its spirit and scope. For example, the flow diagram of FIG. 3 illustrates an independent process for identifying multiple dependencies of transmissions from proxy nodes. One of skill in the art will recognize that this process could be embodied within, or may embody, a conventional dependency identification technique as well. For example, the loop 310-380 could be structured to process all intermediate/forwarding nodes, and the decision block 370 could be structured to determine whether one or both dependencies need to be found, based on the particular node being processed, or based on the particular transmission being processed. In like manner, although this disclosure addresses dual dependencies, one of skill in the art will recognize that additional dependencies may also be identified based on other determinable characteristics of the messages. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
receiving trace data at a network analysis system, the trace data corresponding to messages communicated among nodes of a network,
identifying dependencies between transmissions from an intermediate node of the network and receptions at the intermediate node, and
providing the dependencies to an analysis process of the network analysis system to enable the analysis process to avoid infeasible event sequences,
wherein identifying the dependencies includes identifying a transmission that has a plurality of dependency paths based on each of at least two receptions from different nodes.

2. The method of claim 1, wherein the transmission is to a destination node, and the at least two receptions include a first reception from the destination node and a second reception that is from other than the destination node.

3. The method of claim 2, wherein the first reception is a most recent reception from the destination before the transmission to the destination.

4. The method of claim 3, wherein the second reception is a most recent reception from other than the destination before the transmission to the destination.

5. The method of claim 2, wherein the second reception is a most recent reception from other than the destination before the transmission to the destination.

6. The method of claim 1, wherein identifying the at least two dependencies includes identifying a correspondence between the transmission and at least one of the receptions.

7. The method of claim 6, wherein the correspondence is based at least in part on information in headers of the transmission and the at least one reception.

8. The method of claim 1, wherein identifying the at least two dependencies includes comparing a time of arrival of at least one of the receptions to a time of the transmission.

9. The method of claim 1, wherein identifying the at least two dependencies includes assuring that times of arrival of the at least two receptions are within a given time span of a time of the transmission.

10. The method of claim 1, including adding information to each transmission to facilitate determination of the dependencies.

11. A system comprising:
a traffic collator that is configured to receive trace data corresponding to messages communicated among nodes of a network,
a dependency determinator that is configured to identify dependencies between transmissions from an intermediate node of the network and receptions at the intermediate node, and
a network analysis component that is configured to avoid infeasible event sequences based on the dependencies,
wherein identifying the dependencies includes identifying a transmission that has a plurality of dependency paths based on each of at least two receptions from different nodes.

12. The system of claim 11, wherein the transmission is to a destination node, and the at least two receptions include a first reception from the destination node and a second reception that is from other than the destination node.

13. The system of claim 12, wherein the first reception is a most recent reception from the destination before the transmission to the destination.

14. The system of claim 13, wherein the second reception is a most recent reception from other than the destination before the transmission to the destination.

15. The system of claim 12, wherein the second reception is a most recent reception from other than the destination before the transmission to the destination.

16. The system of claim 11, wherein the dependency determinator is configured to identify the at least two dependencies based on a correspondence between the transmission and at least one of the receptions.

17. The system of claim 16, wherein the correspondence is based at least in part on information in headers of the transmission and the at least one reception.

18. The system of claim 11, wherein the dependency determinator is configured to identify the at least two dependencies based on a comparison of a time of arrival of at least one of the receptions to a time of the transmission.

19. The system of claim 11, wherein the dependency determinator is configured to identify the at least two dependencies subject to times of arrival of the at least two receptions being within a given time span of a time of the transmission.

20. A computer program stored on a computer-readable medium that, when executed, is configured to cause a processor to:
    receive trace data corresponding to messages communicated among nodes of a network,
    identify dependencies between transmissions from an intermediate node of the network and receptions at the intermediate node, and
    provide the dependencies to a network analysis system that is configured to avoid infeasible event sequences based on the dependencies,
    wherein identifying the dependencies includes identifying a transmission that has a plurality of dependency paths based on each of at least two receptions from different nodes.

21. The computer program of claim 20, wherein the program causes the processor to identify the dependencies subject to times of arrival of the at least two receptions being within a given time span of a time of the transmission.

22. The computer program of claim 20, wherein the transmission is to a destination node, and the at least two receptions include a first reception from the destination node and a second reception that is from other than the destination node.

23. The computer program of claim 22, wherein the first reception is a most recent reception from the destination before the transmission to the destination.

24. The computer program of claim 23, wherein the second reception is a most recent reception from other than the destination before the transmission to the destination.

25. The computer program of claim 22, wherein the second reception is a most recent reception from other than the destination before the transmission to the destination.

26. The computer program of claim 20, wherein the program causes the processor to identify the at least two dependencies based on a correspondence between the transmission and at least one of the receptions.

27. The computer program of claim 26, wherein the correspondence is based at least in part on information in headers of the transmission and the at least one reception.

28. The computer program of claim 20, wherein the program causes the processor to identify the at least two dependencies based on a comparison of a time of arrival of at least one of the receptions to a time of the transmission.

* * * * *